Dec. 24, 1935.  C. SHEARD ET AL  2,025,534
ELECTROMOTIVE THERMOMETRY
Filed June 14, 1932   2 Sheets-Sheet 2
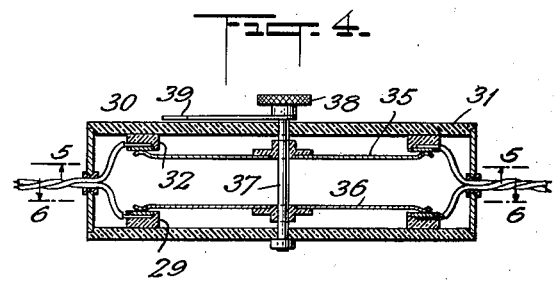
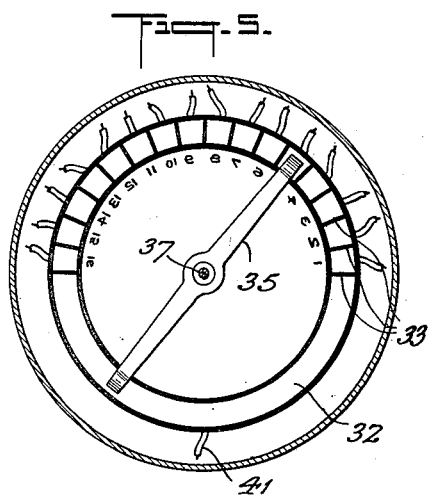
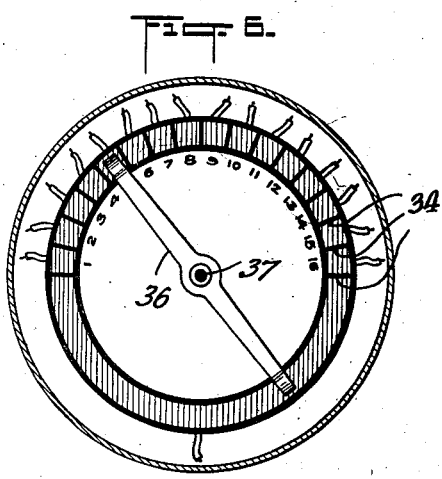
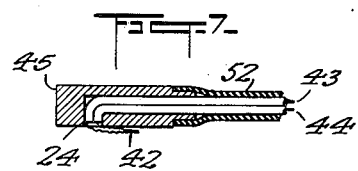
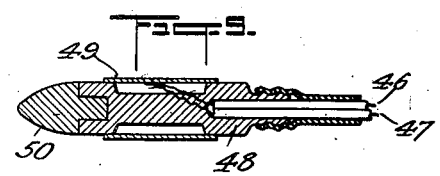
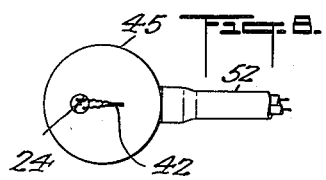
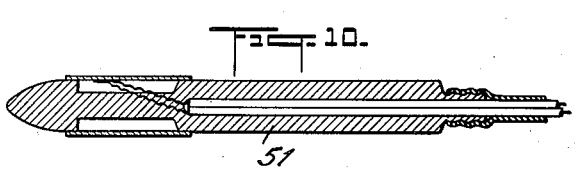
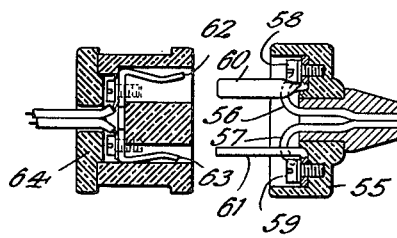
INVENTORS
CHARLES SHEARD
REGINALD HALSTEAD
BY Seward Davis
ATTORNEY Patented Dec. 24, 1935

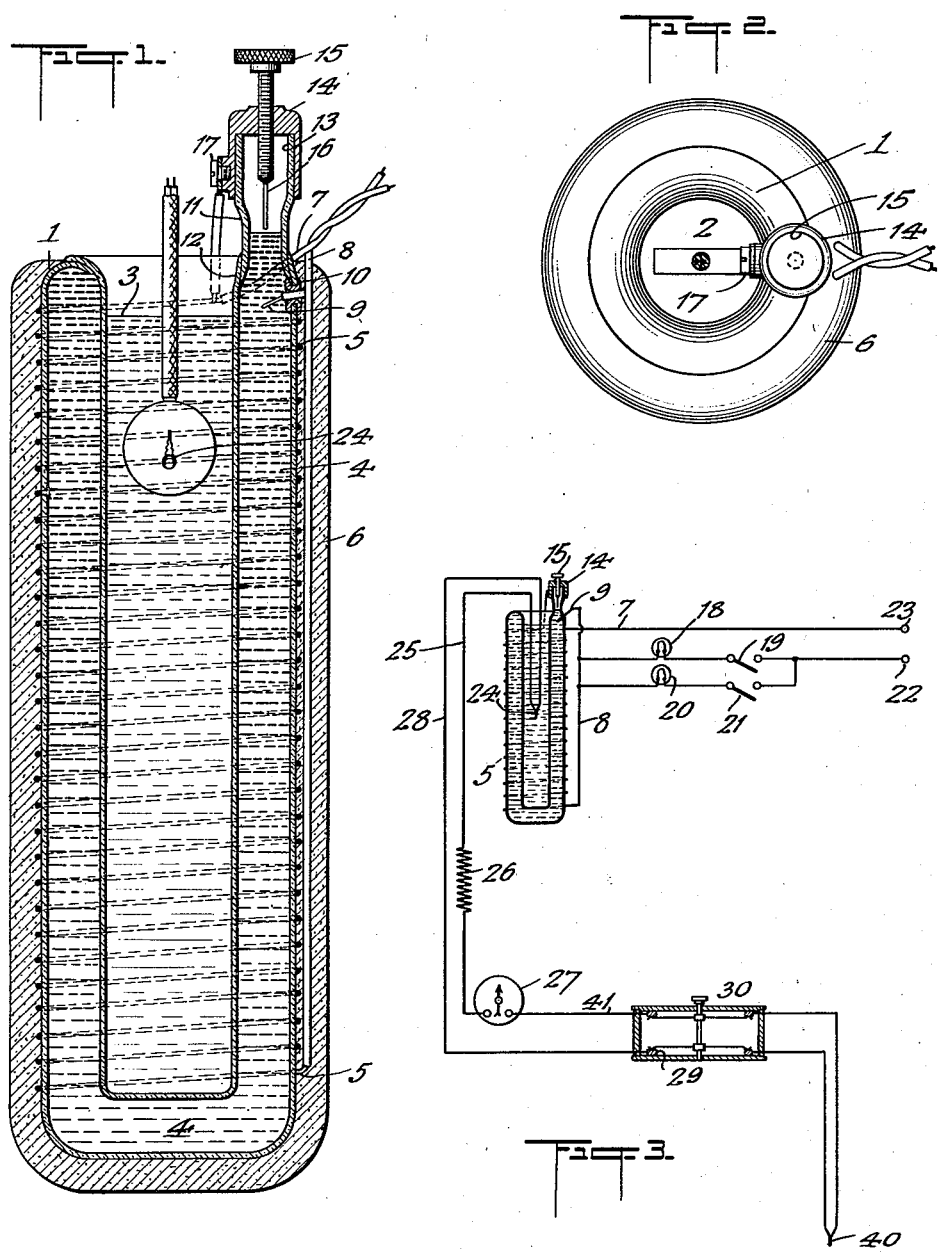

2,025,534

UNITED STATES PATENT OFFICE 2,025,534

ELECTROMOTIVE THERMOMETRY

Charles Sheard and Reginald Halstead, Rochester, Minn., assignors to The Chemical Foundation, Incorporated, New York, N. Y., a corporation of Delaware Application June 14, 1932, Serial No. 617,164

5 Claims. (Cl. 219—19)

This invention relates to the applications of the principles of electromotive thermometry to the simultaneous measurements of intramural, intravenous, superficial and cavity temperatures, especially with reference to such measurements in animal and/or plant tissues.

It is the object of the present invention to provide an ensemble whereby the temperatures on and/or in various portions of a body may be accurately, quickly and simultaneously determined.

With this object in view, we provide a galvanometer (or other current or potential measuring instrument) to which is connected a thermocouple, one junction of which is maintained at a given arbitrarily chosen temperature which is most advantageous to the measurements being taken, the other junction being placed on and/or in the body. A plurality of thermocouples, applied to and/or in those portions of the body of which the temperatures are desired (which temperatures are determined from the previous calibration of the thermocouples), may be associated in turn with the potential or current measuring instrument. In this manner the various thermocouples may be applied or placed in and/or on various portions of the body for any period of time desired and through successive readings of the galvanometer (or other current or potential measuring instrument), the temperatures of the various parts may be quickly, accurately and simultaneously determined.

The invention will be more fully understood by reference to the drawings and the following description, in which a preferred embodiment of the invention is illustrated.

In the drawings, Fig. 1 is a vertical cross-section of a device for the control of the constant temperature of one junction (or common junction) of the thermocouples.

Fig. 2 is a top plan view thereof.

Fig. 3 diagrammatically illustrates the circuit of both the thermocouple and the heating device for the maintenance of a constant temperature of one junction of the thermocouple.

Fig. 4 is a vertical cross-section of the rotary switch.

Figs. 5 and 6 are sections taken along lines 5—5 and 6—6 of Fig. 4; and

Figs. 7 to 11 illustrate various types of thermocouples which may be used in conjunction with our thermometer.

Referring now to Figs. 1 and 2, 1 is a flask, preferably of boro-silicate glass. The flask is U-shaped in cross-section and the cylindrical chamber 2 which it encloses contains a fluid such as oil 3. The flask itself is filled with mercury 4 or some other material which readily responds to temperature changes. A resistance wire 5 is wound around the flask 1. The outside of the flask is coated with a layer of plaster of Paris 6. One end of the electrical heating element or resistance wire 5 is connected to conductor 7 and the other end to conductor 8. A platinum wire 9 projecting within the flask and in contact with the mercury therein leads through the wall of the flask in an air-tight seal 10, its outside end being connected with conductor 8. A capillary tube 11, also of boro-silicate glass, communicates with the flask and is sealed thereto at 12. The upper end of the capillary tube 11 is flared, as indicated at 13, and is provided with a suitable air-tight enclosure, including a cap 14 of conducting material. A thumb-screw 15 projecting through cap 14 carries a platinum wire 16. The cap 14 and therefore the screw 15 and platinum wire 16 are connected with conductor 7 at a binding post 17, provided on the cap 14.

The conductor 8 is connected in parallel through a suitable resistance (incandescent bulb) 18 and switch 19, and resistance (lamp) 20 and a switch 21, with one terminal 22 of an electrical source, such as the usual 110 v. lighting circuit, the other terminal 23 of which is connected with a conductor 7. When it is desired to heat the fluid (such as oil) 3 in chamber 2 to a predetermined temperature, say 40° C., then first the screw 15 is set to a predetermined position, i. e. with the end of the platinum wire 16 at a certain distance from the level of the mercury column in the capillary 11. The two switches 19 and 21 are now closed and current flows from the electrical circuit through a terminal 22 and switches 19 and 21, and resistances 18 and 20 in parallel to conductor 8, and thence through the resistance wire 5 and conductor 7, to the other side of the electrical circuit at terminal 23. When the temperature of the fluid, such as mercury, in flask 1, and hence the temperature of the liquid (oil) in chamber 2, reaches a point where the mercury column in capillary 11 rises to a point where it contacts with platinum wire 16, the resistance wire 5 will be shortcircuited by a path extending from conductor 8, through platinum wire 9, mercury column 4, platinum wire 16, screw 15, cap 14, binding post 17, to wire 7, whereby the heating of the mercury and of the oil will be immediately arrested. An accurately calibrated thermometer may be inserted within the oil contained in chamber 2, and when the temperature indicated on this thermometer rises to within a few degrees of the desired 40° C., one of the switches 21 is opened, thus allowing the temperature of the oil to come more slowly to its desired constant or control value. The temperature of the oil bath 3 and the mercury column constituting the control temperature can be kept constant at less than 0.05° C. if redistilled mercury is used. The heating current, as above stated, is immediately interrupted when the desired temperature is reached. If arcing occurs at the break of the contact between the contact wire 16 and the mercury column, the quenching can be effected in the well-known manner by placing a condenser of suitable capacity across the mercury-platinum make-and-break points.

A thermocouple 24 is immersed in the oil bath 3. We have found that good results are obtained by using thermocouples of constantan and copper. The copper element of the couple 24 is connected through a copper wire 25 and a resistance 26 with one terminal of a sensitive galvanometer 27, e. g. of the d'Arsonval type, or other current or potential measuring instrument; and the other element of the couple 24 is connected through a constantan wire 28 with a segment 29, also of constantan, of a switching device 30. The switching device 30 consists of an insulating casing 31, the bottom of which carries a circular constantan segment 29 and the upper wall a circular copper segment 32. One-half of each segment 29 and 32 is divided by means of insulating partitions 33 and 34, respectively, into commutator sections.

A copper wiping contact 35 cooperates with the segment 32 and a wiping contact 36 of constantan with the segment 29. The two wipers, or wiping contacts are insulatedly mounted on a shaft 37 which is rotatably supported with the casing 31. The shaft 37 is rotated by means of a knurled disc 38 and its angular position is indicated by a pointer 39.

Each one of the commutator sections of the segment 32 is connected with the copper, and each one of the commutator sections of segment 29 with the constantan side of copper-constantan exploring thermocouples, such as 40. Depending on the angular position of shaft 37, the wipers 35 and 36 will connect one or another of the exploring thermocouples with the long conducting sections of the segments 29 and 32 and thence through conductor 28 with the constantan element of thermocouple 24 and through copper wire 41 with a terminal of the galvanometer 27. As well known, the galvanometer will measure and indicate the difference in the electromotive forces set up by the two thermocouples 24 and 40, i. e. the difference between the temperatures to which thermocouples 24 and 40 are subjected. By means of the switch 30, any desired number of thermocouples like 40 (in the present case 16) may be successively connected in circuit, and thus temperature variations in different parts of the body can be readily observed.

The exploring thermocouples are mounted in various types of structures particularly suitable for application to and/or in different parts of the body. For measuring cutaneous (surface) temperature, the thermocouple 42 (Fig. 7) with its constantan and copper wires 43 and 44, is passed through an L-shaped opening in an insulating casing 45, by means of which it may be placed against the section of the skin or surface to be explored.

Fig. 9 illustrates a gastric thermocouple in which the copper and constantan wires 46 and 47 are led through an insulating bushing 48 to a thin copper tubing 49 surrounding said bushing. The bushing is provided with a pointed metal cap 50.

A rectal thermocouple is illustrated in Fig. 10, which is like the gastric thermocouple except that it has no metallic point corresponding to 50, the insulating bushing 51 itself being provided with a pointed end. In the measurement of gastric or rectal temperatures, it is essential that the thermocouple come closely in contact with the thin metallic shell 49, so that it may register as quickly and accurately as possible the temperature of the tissue with which the latter is in contact.

The thermocouple 24 used for immersion in the control liquid is illustrated in Fig. 8. In the thermocouples shown in Figs. 7 to 10, the constantan and copper wires are covered with rubber tubing 52, the end of which is cemented on the mounting of the thermocouple proper.

For intravenous, intramuscular, or intramural work, the thermocouple like 53 is held within a hollow needle 54, mounted on a plug of insulating material 55. The copper and constantan wires 56 and 57 are connected by means of binding posts 58 and 59 to contact fingers 60 and 61 mounted on the plug base 55, and adapted to cooperate with constantan and copper jack contacts 62 and 63 held within a jack base 64 of insulating material. In this manner the needle 54 may be inserted into contact with the part the temperature of which is desired, and then connected with the galvanometer, or the like, through the jack.

Of course, variations in these devices may be effected, depending on the nature of the work in hand.

The control element (Fig. 1), the variably operable switching device (Fig. 4), the galvanometer 27 (or other current or potential measuring instrument), the resistances and switches 18 to 21, and the thermocouples, may be provided in locations most convenient to the user. All these devices may be mounted within a casing so as to be readily transportable from one place to another. The heating element 5 and its connections to a source of electrical current may also be omitted. In this case, instead of the electrically heated liquid bath for the control thermocouple, other temperature control devices may be used; for example, a receptacle in which the temperature may be controlled by the melting point of a solid, such as ice. Other types of insulating containers may also be used.

Having thus described our invention, we claim:

1. An apparatus adapted to maintain the constant-temperature junction of a thermocouple at a predetermined temperature, said apparatus including a heat-insulated vessel containing a heat-responsive medium and surrounding a body of fluid adapted to receive the constant-temperature junction of a thermocouple; a capillary tube projecting from said vessel; an electrical heating element adjacent to said vessel; two connections attached to the heating element and adapted to be connected to a source of current; one of said connections including a switch; a contact wire projecting within said vessel and in contact with said medium, said wire being connected to said switch-connection; a contact in said capillary; means for varying the position of said contact with respect to said medium; a connection from said contact to the other of said first-mentioned connections.

2. An apparatus adapted to maintain the constant-temperature junction of a thermocouple at a predetermined temperature, said apparatus including a heat-insulated vessel containing mercury and surrounding a body of fluid adapted to receive the constant-temperature junction of a thermocouple; a capillary tube projecting from said vessel; an electrical heating element adjacent to said vessel; a connection attached to one terminal of said heating element and adapted to be attached to a source of current; a connection attached to the other terminal of said heating element and adapted to be attached to said source of current, said latter connection including a switch and a resistance; a contact wire projecting within said vessel and in contact with the mercury therein, said wire being connected to said latter connection; a metallic cap for said capillary tube; a thumb-screw projecting through said cap into said capillary tube; a wire carried by said thumb-screw; and a connection from said metallic cap to said first-mentioned connection.

3. An apparatus adapted to maintain the constant-temperature junction of a thermocouple at a predetermined temperature, said apparatus including a heat-insulated flask containing a fluid readily responsive to temperature changes; a cylindrical chamber surrounded by said flask, said chamber containing a fluid adapted to receive the constant-temperature junction of a thermocouple; a resistance wire surrounding said flask, adapted to be connected to a source of current; a closure of conductive material sealing said flask and a contact element extending therethrough; adjusting means adapted to move said contact relatively to the fluid in said flask; a lead from one end of said resistance wire to said closure and contact; a lead from the other end of said resistance wire sealed in the wall of said flask and projecting therethrough into contact with the fluid in said flask; a capillary tube communicating with said flask and located intermediate the adjustable contact of the closure element and the lead entering the flask; whereby the expansion of the fluid in the flask resultant from a rise in temperature therein will establish contact between said fluid and said adjustable contact element and thereby divert the electric current from the resistance wire to the circuit established through the fluid in the capillary tube.

4. In a device of the class described, a vessel adapted to receive articles whose temperature is to be controlled, said vessel having hollow walls filled with mercury, a heating coil surrounding the vessel, and a thermo-regulator operable by thermal changes in volume of mercury in the walls for controlling the heating coil, said thermo-regulator comprising a capillary tube in which the mercury rises and falls as expansion and contraction occurs, and a lead-in conductor in the path of the rising mercury.

5. In a constant temperature device of the class described, a vessel having a cavity therein to be maintained at a constant temperature and in which articles may be placed, a closed mercury reservoir around the sides of the vessel, a heating element arranged to uniformly heat said reservoir, and a thermo-regulator for controlling the heating element, said thermo-regulator being actuated by the thermal changes in volume of the mercury and having an electrical circuit including the mercury.

CHARLES SHEARD.
REGINALD HALSTEAD.